United States Patent [19]

Leon

[11] 4,422,333

[45] Dec. 27, 1983

[54] METHOD AND APPARATUS FOR DETECTING AND IDENTIFYING EXCESSIVELY VIBRATING BLADES OF A TURBOMACHINE

[75] Inventor: Robert L. Leon, Roslyn, Pa.

[73] Assignee: The Franklin Institute, Philadelphia, Pa.

[21] Appl. No.: 385,661

[22] PCT Filed: Oct. 10, 1980

[86] PCT No.: PCT/US80/01341

§ 371 Date: Apr. 29, 1982

§ 102(e) Date: Apr. 29, 1982

[87] PCT Pub. No.: WO82/01416

PCT Pub. Date: Apr. 29, 1982

[51] Int. Cl.³ ............................................. G01M 15/00
[52] U.S. Cl. ....................................................... 73/660
[58] Field of Search ................. 73/116, 579, 587, 593, 73/660

[56] References Cited

U.S. PATENT DOCUMENTS

3,400,578  9/1968  Frarey et al. ......................... 73/660
3,731,526  5/1973  Games .................................. 73/660
4,352,293  10/1982  Kurihara et al. ................. 73/660 X

*Primary Examiner*—Jerry W. Myracle
*Attorney, Agent, or Firm*—John C. Dorfman

[57] ABSTRACT

A method and apparatus for detecting and identifying one or more excessively vibrating blades of the rotating portion of a turbomachine utilizing analysis of the characteristic Doppler waveform that results as the rotating, vibrating blade passes a fixed sensor. The acoustic energy in the vicinity of the rotating portion of the turbomachine is sensed to generate a composite electrical signal representative of the broadband acoustic spectrum. Then, through both time domain and frequency domain signal manipulations, the undesirable noise components of the composite signal are removed. The resulting signal is then displayed to reveal the characteristic Doppler waveform of the blade vibrations, which may be analyzed to indicate the location of the excessively vibrating blade as well as its relative vibration amplitude. Changes in the latter with time indicate the initiation or propagation of a blade crack.

9 Claims, 14 Drawing Figures

METHOD AND APPARATUS FOR DETECTING AND IDENTIFYING EXCESSIVELY VIBRATING BLADES OF A TURBOMACHINE

BACKGROUND OF THE INVENTION

1. Field of the Invention

This invention relates generally to a method and apparatus for detecting and identifying excessively vibrating blades in a turbomachine and, more particularly, to such a method and apparatus which is employed while the turbomachine is operating.

2. Description of the Prior Art

It is generally known that turbomachinery blade failures are a major problem and, particularly in the steam turbine generator area, are the cause of many forced outages for U.S. electrical generating utilities. In the early stages of most blade failures, the blade will experience cracks, which may be the result of high cycle fatigue or stress corrosion combined with fatigue. In either event, it is undesirable and excessive blade vibration that leads to the formation of a fatigue crack and to eventual blade failure.

High amplitude, resonant, order related blade vibration results when one of the forcing frequencies that act on a rotating turbomachinery blade coincides with one of the blade's many natural frequencies. In a turbine, the forcing frequencies which may cause such excessive blade vibration comprise all of the multiples of nozzle passing frequency, and all of the multiples of running speed. The former arise from the series of kicks that each blade receives in passing the nozzle wakes, while the latter are due to flow non-uniformities arising from the horizontal split of the nozzle diaphragms and casing, internal struts, inlet or exhaust openings, nozzle plates, or the like. In each case, the multiples, or harmonics of the fundamental forcing frequency are caused by the non-sinusoidal nature of the forcing waveform. Obviously, for a constant speed turbine, the values of all these forcing frequencies are precisely known for each blade stage.

This is not the case, however, for the natural frequencies of the various blades. Here, uncertainties in the degree of fixity between fastener and wheel or tenon and shroud, and the necessity for empirical estimations as to the effects of centrifugal loading, all lead to uncertainties in the predicted values of the natural frequencies of the blades. in addition, normal manufacturing and assembly tolerances lead to variations from one blade to the next. Since the most predictable modes are the lower frequency modes, and since they are also the modes most likely to be subjected to high amplitude excitation, they are the ones that manufacturers concentrate on in attempting to avoid such resonant matches.

Actual vibration amplitudes in a resonant match of one of the forcing frequencies with one of the natural frequencies of the blade depend on the level of the input at the forcing frequency, on the mode shape and amplification factor of the affected mode, and on the degree of match between the natural frequency and the forcing frequency. When the two frequencies differ, the vibration occurs at the forcing frequency, not the natural frequency. For example, in some steam turbine blade modes, amplification factors as high as 400 are not uncommon. In addition to indicating the level of increase in amplitude for an exact resonant match, the amplification factor indicates how the vibration amplitude varies with the degree of match. For example, for just a 1% difference between the forcing frequency and the natural frequency, the vibration amplitude drops 25% of its full resonant value for an amplification factor of 200, and to 12% of its full resonant value for an amplification factor of 400. Thus, although the high amplification factor modes are potentially more damaging, they require a more perfect frequency match to excite them at their most damaging levels. Therefore, it is apparent that due to the previously mentioned variation in the natural frequencies blade to blade, only a few of the blades or blade groups in a given blade row of the rotating portion of a turbo machine might undergo excessive, high amplitude vibration at a given time.

The extreme sensitivity to the degree of match between the forcing and natural frequencies for high amplification factor modes has still another potential benefit. If a resonantly vibrating blade develops a fatigue crack, it is likely that the affected natural frequency will be shifted by 1% or more. As indicated above, the accompanying reduction in amplitude should be significant and can be used as one indicator of the initiation of a crack. Thus, a monitoring system that can measure individual resonant blade vibrations, is also able to indicate crack inception and growth. However, the primary purpose of such a system is to detect and identify excessively vibrating blades so that such blade may be replaced before actual fatigue cracking occurs. In this manner, the turbomachine may be operated in a safer, more efficient manner while avoiding the inconvenient and expensive outages which may result from unanticipated turbine blade failures.

SUMMARY OF THE INVENTION

Briefly stated, the present invention provides a method and apparatus for detecting and identifying one or more excessively vibrating blades of the rotating portion of a turbomachine by analysis of the characteristic Doppler waveform as sensed by a nearby stationary acoustic sensor. The Doppler waveform is the result of the single frequency acoustic energy radiated by the blades, and the changing position and velocity of the blades relative to the sensor. The method comprises sensing the total acoustic energy at a fixed location proximate the rotating portion of the turbomachine to generate a composite electrical signal. Signal manipulations are then performed upon the composite signal in both the time domain and the frequency domain to remove the undesirable noise generated components in order to reveal the characteristic Doppler waveform. The signal manipulations include: detecting the composite signal; synchronous time averaging to remove random noise and undesirable non-order related components and blanking out the order related noise components. The resulting characteristic Doppler waveform is then displayed for interpretation by the operator, or it may be additionally manipulated prior to display to further aid in its interpretation.

BRIEF DESCRIPTION OF THE DRAWINGS

The foregoing summary, as well as the following detailed description of the preferred embodiments of the present invention, will be better understood when read in conjunction with the accompanying drawings, in which:

FIG. 4A$_1$ is a graphic representation of the waveform at point A of FIG. 3:

FIG. 4A$_2$ is a graphic representation of the frequency spectrum at point A of FIG. 3;

FIG. 4B$_1$ is a graphic representation of the waveform at point B of FIG. 3;

FIG. 4B$_2$ is a graphic representation of the frequency spectrum at point B of FIG. 3;

FIG. 4C$_1$ is a graphic representation of the waveform at point C of FIG. 3;

FIG. 4C$_2$ is a graphic representation of the frequency spectrum at point C of FIG. 3;

FIG. 4D$_1$ is a graphic representation of the waveform at point D of FIG. 3;

FIG. 4D$_2$ is a graphic representation of the frequency spectrum at point D of FIG. 3;

FIG. 4E$_1$ is a graphic representation of the waveform at point E of FIG. 3; and FIG. 4E$_2$ is a graphic representation of the frequency spectrum at point E of FIG. 3

DESCRIPTION OF THE PREFERRED EMBODIMENTS

Figure 1:
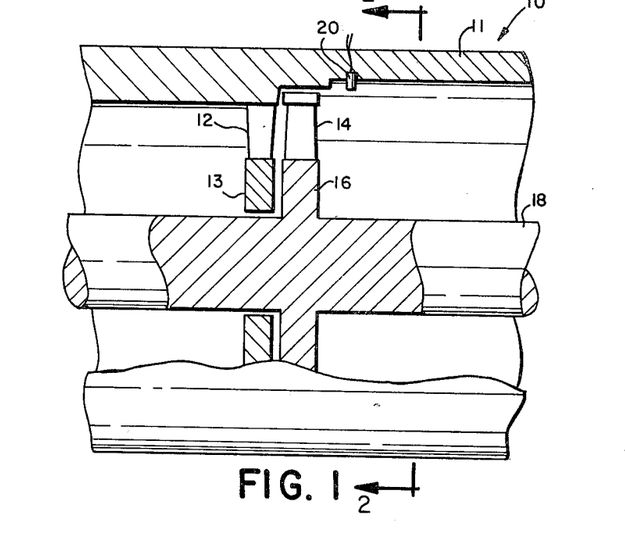
FIG. 1 is an axial sectional view of a portion of a steam turbine.

Referring to the drawings, and particularly to FIG. 1, there is shown a portion of a turbomachine, for example, a steam turbine 10. The steam turbine 10 is of a type generally well known in the art and a detailed explanation of all of its structure and operation is not necessary for a complete understanding of the present invention. Suffice it to say that a pressurized operating fluid, in this case steam, is introduced into the left or upstream end of the generally cylindrical turbine casing 11 from a convenient source, for example, a coil or oil fired boiler. The steam flows to the right or axially downstream over a plurality of generally radially directed circumferentially distributed guide vanes or nozzles 12 which terminate in a ring 13 and are arranged to concentrate and properly orient the steam flow. The concentrated and properly oriented steam then flows over a plurality of generally outwardly radially extending buckets or turbine blades 14 which are attached through a suitable rotor disk 16 to a centrally located axially rotating turbine shaft 18. As the steam passes through the aerodynamically shaped turbine blades 14, energy is removed from the steam and is imparted through the blades to drive the shaft 18 into rotation. The steam may then pass downstream to subsequent stages of nozzles and blades (not shown) where additional energy may be removed from the steam and imparted to the rotating shaft 18. The rotating turbine shaft 18 may be employed to do useful work, for example, by driving an electric generator unit (not shown).

As discussed in detail above, in a turbomachine like the steam turbine 10, there are significant operational and maintenance problems caused by excessive vibration of the blades 14. The present invention involves a method for pinpointing the specific individual blades of an operating turbomachine that are vibrating excessively, utilizing the acoustic energy radiated by the vibrations of the blades as determined by a fixed dynamic pressure transducer or sensor 20. The sensor 20 may be mounted in the turbine casing 11 slightly downstream from the rotating blades 14.

It is generally known that any rotating turbomachinery blade that is vibrating excessively will radiate acoustic energy into the surrounding fluid environment at the frequency of its vibration. If the radiated energy is to be detected by a relatively fixed or stationary sensor 20 and if the energy radiating blade is simultaneously rotating such that it has a velocity component along a line joining the moving blade and the fixed sensor 20, then the frequency of the energy radiated from the blade as detected by the sensor 20 will be altered from the frequency actually radiated from the blade. This concept is known as moving source Doppler and the new frequency as detected by the sensor is given by the following formula:

$$f' = f(V+w)/(V+w-v) \tag{1}$$

where
 f is the frequency of the radiating source or vibrating blade;
 f' is the frequency detected by the sensor;
 v is the instantaneous velocity of the blade toward the fixed sensor along a line joining the blade and the sensor;
 w is the average velocity of the surrounding operational fluid moving toward the fixed sensor along a line joining the blade and the sensor; and
 V is the velocity of sound in the operating fluid.

Figure 2:
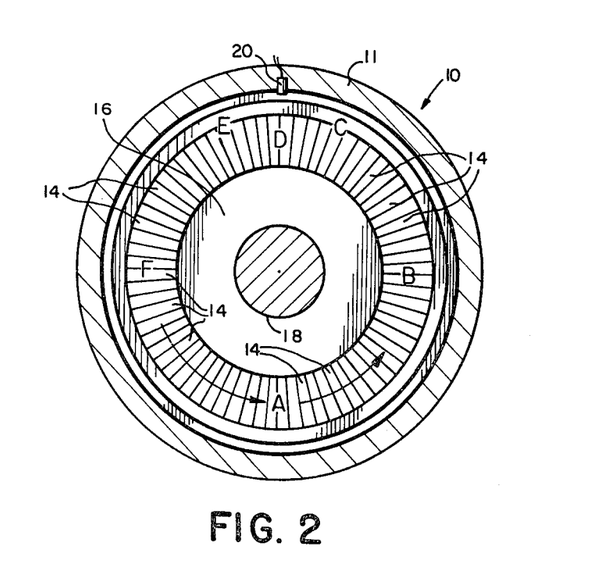
FIG. 2 is a sectional view of the steam turbine of FIG. 1 taken along line 2—2.

In order clearly to illustrate the principle behind the moving source Doppler method, suitable reference marks A-F have been placed at various positions around the turbine 10 as shown on FIG. 2. When, during its rotation, a single excessively vibrating blade is instantaneously located at position A, the vibrating blade is at its greatest distance from the sensor 20. Since the amplitude of the acoustic energy radiated from the vibrating blade which arrives at the sensor 20 is inversely related to the distance between the sensor 20 and the vibrating blade, the amplitude of the acoustic energy detected by the sensor 20 from the vibrating blade is at its lowest level when the vibrating blade is instantaneously located at position A. In addition, since at position A the instantaneous velocity component of the vibrating blade toward the sensor 20 (v in the above equation) is zero, the frequency of the acoustic energy as detected by the sensor 20 is the same as the actual frequency of the vibrating blade.

As the vibrating blade moves around to position B, the blade is closer to the sensor 20 and has a significant instantaneous velocity component toward the sensor 20. Thus, both the amplitude and the frequency of the energy radiated from the blade as detected by the sensor 20 are substantially increased.

When the vibrating blade reaches position C, it is closer yet to the sensor 20 and its instantaneous velocity component toward the sensor 20 is at its maximum. Thus, at position C, the amplitude of the energy radiated from the vibrating blade as received by the sensor 20 is increased and the frequency of the radiated energy as detected by the sensor 20 is at its maximum.

At position D, the vibrating blade is instantaneously at its closest distance to the sensor 20 so the amplitude of the radiated energy received by the sensor 20 from the vibrating blade is at its maximum value. However, since there is no instantaneous velocity component of the vibrating blade in the direction toward the sensor 20, the frequency of the blade vibrations as detected by the sensor 20 is the actual frequency of the vibrating blade.

As the vibrating blade reaches position E, the distance from the sensor 20 and thus the amplitude of the energy received by the sensor 20 is the same as it was at position C. However, since the instantaneous velocity component of the blade is at its maximum in a direction away from the sensor 20, the frequency detected by the sensor 20 is at its minimum.

At position F, the amplitude of the energy received by the sensor 20 is the same as it was at position B but the negative instantaneous velocity component of the blade results in the frequency detected by the sensor 20 being below the actual blade vibrating frequency.

In summary, as the vibrating blade approaches the sensor 20, both its frequency and amplitude appear to increase. After passing the sensor, its frequency appears to decrease sharply and its amplitude appears to decrease slowly as it moves away. By starting at a known rotor position (in a manner as described in detail below) and using suitable sampling techniques, a characteristic Doppler waveform (which is repeated exactly the same for each revolution of the turbine shaft 18) indicating the amplitude and frequency variations may be plotted as a function of time, and from the Doppler waveform, the location of the excessively vibrating blade can easily be determined. This technique may still be applicable to blades which are rotating at speeds in excess of the speed of sound in the operating medium, for example gas turbine engine compressors, when as seen by formula 1 above, the speed of the rotating blade still does not exceed the effective speed of sound $(V+w)$.

Although the above-described method in theory is a useful way of detecting and identifying one or more excessively vibrating turbomachinery blades, in a real world environment, additional acoustical signals inherent in the operation of the turbine 10 come into play to form a composite signal which tends to mask the charateristic Doppler waveform and to severely complicate the method. For example, the rush of the fluid medium (in this embodiment, steam) around the sensor 20 and the adjacent turbine casing results in the generation of a significant, broadband random noise signal which may be an order of magnitude greater in amplitude than the Doppler signal from the excessively vibrating blades. In addition, order related signals, such as blade passing frequency, running speed, etc., and their harmonics, may also be an order of magnitude greater than the Doppler signal. The additional acoustical signals, all of which are also detected by the sensor 20, tend to mask or drown out the desired Doppler signal. The present invention involves a straightforward method for manipulating the output signal from the sensor 20 in order to circumvent the above-discussed real world operational problems involved in employing the moving source Doppler technique to detect and identify one or more excessively vibrating turbine blades.

The method of the present invention may be best understood by setting forth an illustrated example. For the purposes of the example, the turbine 10 is assumed to comprise 64 nozzles and 67 blades, each blade having an effective radius of 0.762 m (30 inches). The turbine shaft 18 is assumed to be rotating at a constant 3000 rpm, thereby establishing the circumferential velocity of the blades 14 at 239.4 meters/second (9,425 inches/second). The radius of the turbine casing at the location of the sensor 20 is 0.838 meters (33 inches). The velocity of sound in the steam is assumed to be 381 m/s (15,000 in/s), and, since the absolute velocity of the steam leaving the blades 14 is mostly axial, the steam serves to increase the effective sound velocity only when a vibrating blade is near the sensor 20. For simplicity, this is neglected in the ensuing discussion.

It is also assumed that three of the blades 14 are vibrating excessively at the nozzle passing frequency 3,200 Hz, and for simplicity, all three blades are vibrating at the same amplitude. It is further assumed that the first of the excessively vibrating blades is located at a position 90° behind the sensor 20 (at position B of FIG. 2) at the beginning of the record and that the second and third excessively vibrating blades are located 8 and 17 blades respectively behind the first blade.

Figure 3:
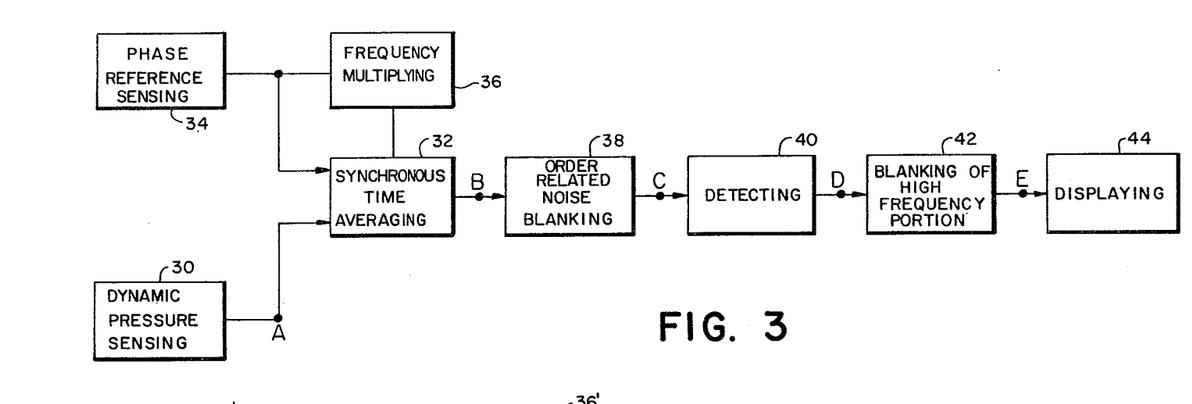
FIG. 3 is a schematic block diagram of a first method of detecting and identifying excessively vibrating blades of a turbomachine.
Figure 4A:
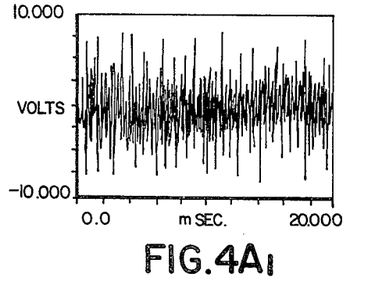
Figure 4A:
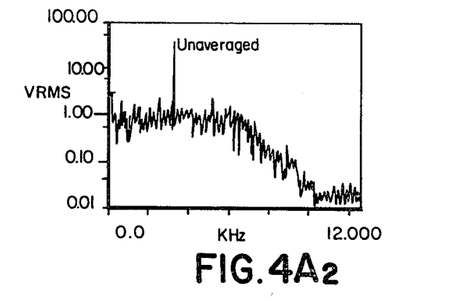

Referring now to FIG. 3, there is shown a functional block diagram of the method of the present invention. The first step shown in functional block 30 is the sensing of the composite acoustical signals at a single fixed location slightly downstream from the turbine stage, for example, by sensor 20. FIG. $4A_1$ shows the single revolution waveform at point A of FIG. 3 resulting from the sensing of the aggregate acoustical signal. It is clear from FIG. $4A_1$ that no characteristic Doppler waveform is readily discernable. FIG. $4A_2$ is a representation of the corresponding frequency spectrum of the single revolution waveform signal at point A of FIG. 3. As expected, the broadbanded frequency spectrum in this form is not particularly helpful in detecting or identifying the three excessively vibrating turbine blades.

The random steam flow noise component may be substantially reduced from the sensed acoustic signal at point A of FIG. 3 through the application of the known procedure of synchronous time domain averaging as shown in functional block 32. A once per revolution phase reference signal is generated (as shown in functional block 34 of FIG. 3) and is utilized in the time domain averaging procedure. The phase reference signal may be accomplished by known sensing methods. For example, a fixed fiberoptical probe (not shown) may be employed to sense the passing of a small reflective tape segment located at a fixed position on the turbine shaft 18. The phase reference sensing results in the generation of a pulse each time the same portion of the turbine shaft 18 passes by the probe, thereby establishing the passing of a fixed known blade position.

The phase reference pulses are employed in the synchronous time averaging process to indicate the beginning of each revolution of the turbine shaft 18 and the beginning of each sampling process. The number of samples in a record may be any value, but it is usually some power of two. 512 samples per record are assumed for this example. Additionally, the sampling interval or time spacing between each of the 512 samples may be any fixed value; however, it is preferred to have the sampling interval such that all 512 samples comprise exactly one revolution. This is accomplished by frequency multiplying the phase reference signal by 512 (functional block 36), the resultant signal serving as the sampling clock. Of course, the waveform must be low pass filtered at less than half this sampling rate prior to its being sampled to prevent aliasing. The synchronous time domain averaging process involves a repetition of sampled records, each starting at the phase reference, with the corresponding sampled points of each then added algebraically and divided by the total number of averages. The result is that any signal which is not repeated at the exact same point in the rotational cycle eventually averages to zero. Obviously, the random steam flow noise as well as any other random or non-synchronous noise signals fall into this category. The repetitive Doppler waveform from any blades that are vibrating excessively at some multiple of running speed, as well as any other order related signals remain undiminished by the time domain averaging process. It will be appreciated that the length of time that the time domain averaging process is continued may vary depending upon the relative amplitudes of the random noise signals to the desirable Doppler waveform signals. Obviously, the longer the time averaging is continued, the less significant the random noise signals become. In the case of a turbine operating at 3000 rpm, up to 10,000 averages could be completed in less than seven minutes.

Figure 4B:
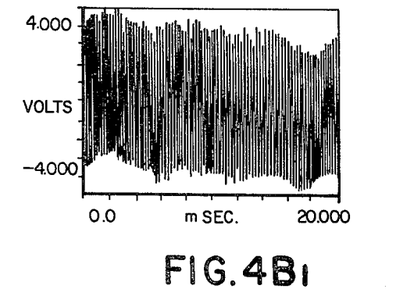

A representation of the single revolution waveform at point B of FIG. 3 resulting after significant synchronous time domain averaging is shown on FIG. $4B_1$. As shown, although the synchronous time averaging process is effective in removing the random noise, the resulting signal is still insufficient to reveal the needed information regarding the excessively vibrating blades.

Figure 4B:
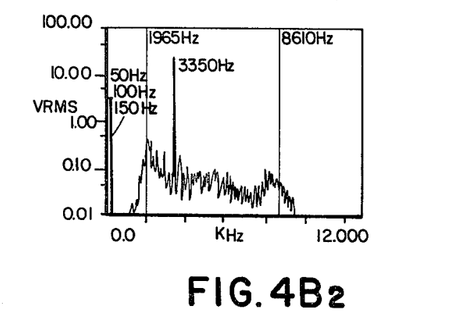
Figure 4C:
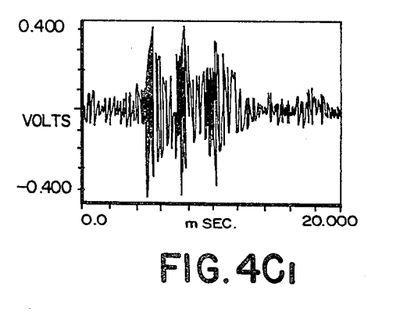
Figure 4C:
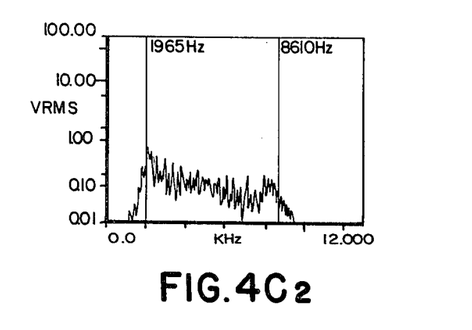
Figure 4D:
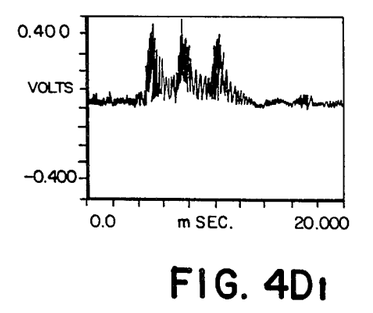
Figure 4D:
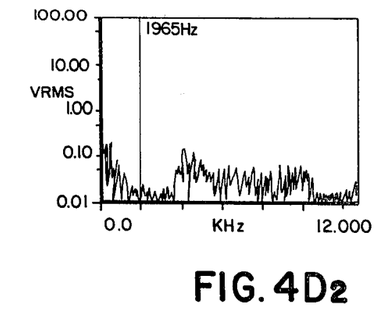

FIG. $4B_2$ shows the corresponding frequency spectrum. Even though only the magnitude is shown in FIG. $4B_2$, the frequency spectrum actually includes both magnitude and phase information because of the known starting position as established with the phase reference sensing of functional block 34. Thus, it is possible to go back and forth between the frequency domain and the time domain at will in order to perform signal manipulations in either domain.

FIG. $4B_2$ shows the characteristic Doppler spectrum of the waveform of FIG. $4B_1$, but gives no clear indication of how many turbine blades may be vibrating excessively or in what positions the vibrating blades may be located. In fact, it shows no clear evidence of Doppler at all. The problem, of course, relates to the presence of a few large discrete components, clearly visible in the spectrum. The largest component at 3,350 Hz is the blade passing component, and it clearly dominates the scene. Also included are large components at running speed, and the 2nd and 3rd harmonics of running speed, 50 Hz, 100 Hz and 150 Hz. These are evidenced in the general up and down movement of the waveform.

All of these signal components are order related or repetitive on a rotational basis and therefore are not removable through synchronous time averaging. However, they can be conveniently removed, or blanked, directly from the complex frequency spectrum utilizing blanking techniques which are well known to those skilled in the art. Then the blanked or modified spectrum can be inverse transformed back into the time domain, and the Doppler waveform should become apparent. These components can be either completely blanked (replaced with zeroes), or the real and imaginary values of the affected spectral points can be replaced with interpolated values. It is the latter technique that has been employed in the order related noise blanking functional box 38 of FIG. 3 used here to modify the spectrum of FIG. $4B_2$.

FIG. $4C_2$ shows the modified spectrum at point C of FIG. 3 and FIG. $4C_1$ shows the corresponding modified reconstructed time waveform obtained by inverse transforming of the modified spectrum of FIG. $4C_2$. The three Doppler signatures that were buried in the original time waveforms of FIG. $4A_1$ and $4B_1$ are now readily apparent, with no shifting in the time domain occurring from the frequency domain blanking and inverse transform procedure. Thus, the capability of locating the three excessively vibrating blades remains unimpaired despite the frequency blanking process.

The essence of the technique should now be clear. The Doppler mechanism transforms the single frequency of the vibrating blades into a broadband multi-frequency function which contains information as to the location of the vibrating blades. Like the original frequency, all the new frequencies are order related since the waveform retains its rotationally repetitive nature in the time domain. Thus, it is at once possible to use synchronous time domain averaging to remove the non-rotational masking effects, and to use discrete frequency blanking to remove the order related masking effects, the latter process hardly distorting the desired signal since the information in the Doppler signature is spread so broadly in the frequency domain.

A key feature of the present invention is its ability to identify the location of the excessively vibrating blades. Thus, the object is to know exactly when the vibrating blade is directly beneath the sensor. This does not coincide with the maximum frequency point or with the minimum frequency point, each of which is difficult to ascertain from the waveform anyway. Rather, it coincides with the maximum of the amplitude envelope of the waveform, corrected by the time it takes for sound to travel to the sensor from a blade directly beneath it (see formula 1 above). In this example, this correction time is 0.0762 (3 in.) divided by 381 m/s, (15,000 in/s), or 0.20 ms.

The amplitude envelope of the waveform may be developed, as shown in FIG. $4D_1$, by first detecting (functional block 40 of FIG. 3) or making positive all of the negative going peaks of the waveform of FIG. $4C_1$. Detecting may be accomplished as above or by other suitable techniques such as squaring each point. Detecting has the dual effect of shifting the frequency of the original Doppler signature upward, while adding in a new frequency band as shown in the corresponding frequency spectrum of $4D_2$.

Next, all of the frequency components above 1965 Hz (the original Doppler minimum frequency as predicted by formula 1 above) of the frequency spectrum of FIG. $4D_2$ are blanked to zero as shown in functional box 42, leaving just the low frequency portion of the spectrum as shown in FIG. $4E_2$ (representing the frequency spectrum at point E of FIG. 3). Reconstruction (inverse transforming) of the low frequency spectrum portion of FIG. $4E_2$ then yields the corresponding new time waveform of FIG. $4E_1$. The enhanced time waveform of FIG. $4E_1$ is proportional to and synchronized with the envelope of the original Doppler waveform.

Figure 4E:
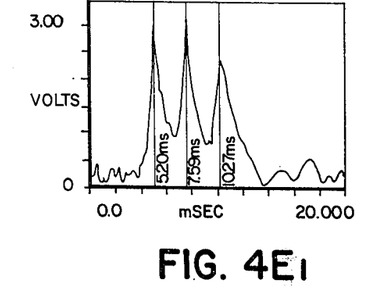
Figure 4E:
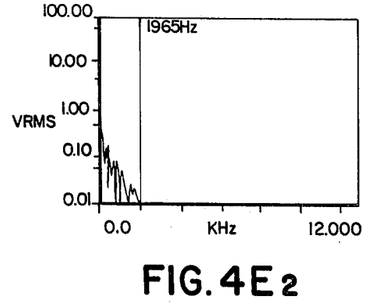

The resulting waveform of FIG. $4E_1$ is then displayed (functional block 44 of FIG. 3) for purposes of analysis by an operator. As shown in such a display, the three time markers of FIG. $4E_1$, at 5.20 ms, 7.59 ms, and 10.27 ms (with 0.20 ms added for the travel time correction), correspond to the times from the beginning of the record (when the phase reference pulse appears) that the three excessively vibrating blades pass beneath the sensor 20. Recall that the resolution from one blade to the next is 0.30 ms in this example. Thus, the enhanced characteristic Doppler waveform detects the vibrating blades, indicates their relative vibration level and pinpoints their location. The displayed signal may be analyzed over a period of time to determine changes in the relative amplitude of a blade's vibration. As discussed above, the changes are indicative of the initiation or propagation of a blade crack.

The above-described method may be employed to detect and identify excessively vibrating turbomachinery blades in cases in which the vibrations are order related. For example, the above-described method may be employed to detect and identify such vibrating blades where the vibrations are caused by nozzle passing frequency, running speed, or any harmonics thereof. However, the above-described method is not effective in detecting and identifying such vibrating blades where the vibrations are non-order related. For example, self-excited vibration of a turbine blade at its own natural frequency independent of the running speed or flutter is such a non-order related vibration which may not be detected by the above-described method. Although the single sensor 20 detects the non-order related vibrations as well as the order related vibrations, the subsequent signal manipulation steps as described above are established to isolate the order related vibrations and to eliminate non-order related signals. Accordingly, to employ the moving source Doppler technique for the detection and identification of excessive non-order related vibrations in the blades, it is necessary to slightly modify the above-described method of manipulating the signal from the sensor.

Figure 5:
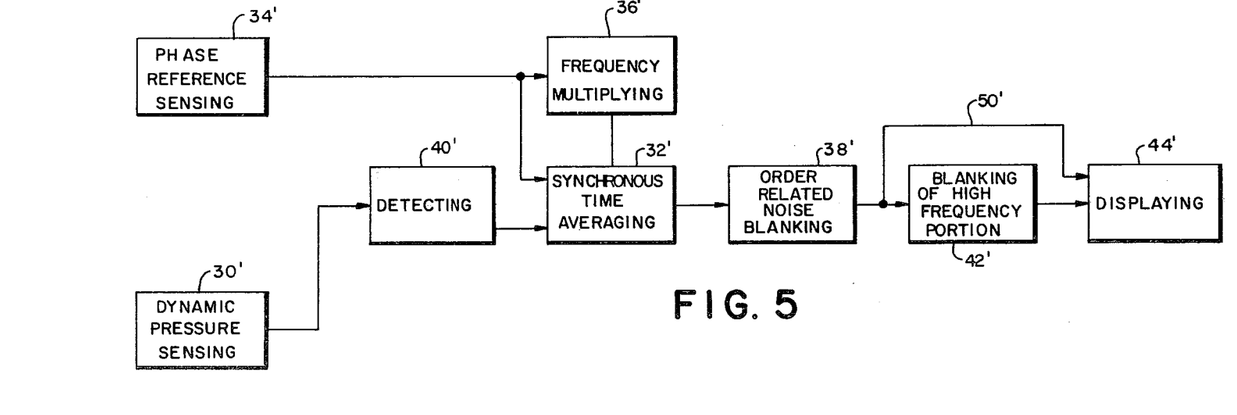
FIG. 5 is a schematic block diagram of a second embodiment of the present invention.

FIG. 5 shows another embodiment of the present invention which may be employed for the detection and identification of either order related or non-order related vibrations in rotating turbomachinery blades. The method makes use of the fact that the envelope of the Doppler waveform is order related even though the waveform itself may not be. The signal manipulation steps of the method of FIG. 5 are substantially the same as those of the above-described method as shown in FIG. 3, except that the order of the steps is slightly rearranged. Accordingly, the functional blocks of FIG. 5 will be identified using the same reference numerals as were used on FIG. 3 with the addition of primes thereto.

As mentioned above, in the embodiment of FIG. 5, the dynamic pressure sensing 30' phase reference sensing 34' and frequency multiplying 36' operations, as well as the sampling rate, are exactly the same as the corresponding operations of the embodiment of FIG. 3. However, in the FIG. 5 embodiment, the signal from the dynamic pressure sensing 30' are first passed through a detecting operation 40' wherein the signals are essentially full wave rectified. In this manner, the subsequent synchronous time averaging operation 32' averages the Doppler waveform to the mean value of its envelope and the random noise to a D.C. value (rather than to zero as is done in the embodiment of FIG. 3).

The detected and envelope time averaged signal is then passed to the order related noise blanking operation 38' wherein, operating in the frequency domain as described above, the undesirable, now doubled, order related components of the signal (i.e., blade passing component), as well as the D.C. component resulting from the time averaging of the random noise components, are blanked out of the signal.

An inverse transformation or reconstruction of the frequency domain signal remaining after the order related noise blanking operation 38' yields a time domain waveform which, in the case of non-order related vibrations, will be similar to the waveform of FIG. 4E$_1$. Thus, as shown by line 50', in the case of non-order related vibrations, the time domain waveform may be directly displayed and interpreted to determine the location of the excessively vibrating blades.

In the case of order related vibrations, a reconstruction of the frequency domain signal remaining after the order related noise blanking operation 38' yields a time domain waveform which is similar to the waveform of FIG. 4D$_1$. As discussed above in relation to the embodiment of FIG. 3, it is necessary to blank out the high frequency components of the signal in order to obtain a clear resolution of the waveform. This is accomplished, in the case of order related vibrations, by the blanking of high frequency portion operation as shown in functional block 42'. An inverse transformation of the signal remaining after the high frequency blanking operation results in a time domain waveform similar to that of FIG. 4E$_1$ which may then be displayed and interpreted.

From the foregoing description, it can be seen that the present invention comprises a method and apparatus for detecting and identifying excessively vibrating turbomachinery blades which is relatively simple to employ and requires only a single stationary sensor for each rotating blade stage. It will be recognized by those skilled in the art that changes or modifications may be made to the above-described embodiments without departing from the broad inventive concepts of the invention. It is understood, therefore, that this invention is not limited to the particular embodiments disclosed, but it is intended to cover all modifications which are within the scope and spirit of the invention as defined by the appended claims.

I claim:

1. A method for detecting and identifying an excessively vibrating blade of the rotating portion of a turbomachine by analysis of the characteristic Doppler waveform resulting from the vibrating blade comprising the steps of:

sensing the acoustic energy at a fixed location proximate the rotating portion of the turbomachine to generate a composite electrical signal;

synchronous time averaging the composite signal to remove random noise and non-order related components therefrom;

blanking out the order related noise components of the synchronous time averaged signal to reveal the characteristic Doppler waveform of the vibrating blade; and displaying the resulting characteristic Doppler waveform to indicate the location of the excessively vibrating blade and its relative vibration amplitude.

2. The method as recited in claim 1 further including the step of envelope detecting the blanked, synchronous time averaged signal to enhance the amplitude envelope prior to displaying the resulting waveform.

3. A method for detecting and identifying an excessively vibrating blade of the rotating portion of a turbomachine by analysis of the characteristic Doppler waveform resulting from the vibrating blade comprising the steps of:

sensing the acoustical energy at a fixed location proximate the rotating portion to generate a composite electrical signal;

sensing the phase of the rotating portion to generate a phase reference signal representative of the time when a predetermined location on the rotating portion passes a fixed location;

sampling the composite signal and synchronously time averaging at least two time records of the sampled composite signal utilizing the phase reference signal as an initiation trigger;

blanking out the order related noise from the synchronous time averaged signal to reveal the characteristic Doppler waveform resulting from the vibrating blade;

detecting the blanked signal;

blanking out the high frequency portion of the detected signal to enhance the amplitude envelope; and displaying the resulting enhanced signal to pinpoint the location of the vibrating blade and indicate its relative vibration amplitude.

4. The method as recited in claim 3 further including the step of establishing a sampling rate so that the number of samples in each time record multipled by the sampling rate exactly matches one revolution of the rotation portion.

5. A method for detecting and identifying an excessively vibrating blade of the rotating portion of a turbomachine by analysis of the characteristic Doppler waveform resulting from the vibrating blade comprising the steps of:

sensing the acoustic energy at a fixed location proximate the rotating portion of the turbomachine to generate a composite electrical signal;

detecting the composite signal;

synchronous time averaging the detected composite signal to remove random noise and undesirable non-order related components therefrom;

blanking out the order related noise components of the synchronous time averaged signal; and displaying the resulting signal to reveal the characteristic Doppler waveform of the vibrating blade, or its envelope to pinpoint the location of the excessively vibrating blade and indicate its relative vibration amplitude.

6. The method as recited in claim 5 further including the step of blanking out the high frequency portion of the blanked synchronous time averaged signal prior to displaying the resulting signal.

7. The method as recited in claims 1, 2, 3 or 5, further including the step of analyzing the displayed signal over a period of time to determine changes in the relative amplitude which indicate the initiation or propagation of a blade crack.

8. An apparatus for detecting and identifying an excessively vibrating blade of the rotating portion of a turbomachine by analysis of the characteristic Doppler waveform resulting from the vibrating blade comprising:

sensor means disposed at a fixed location proximate the rotating portion of the turbomachine for sensing the acoustical energy and generating a composite electrical signal in response thereto;

detecting means for detecting the composite signal;

time averaging means for synchronous time averaging the detected composite signal to remove random noise and undesirable non-order related components therefrom;

blanking means for blanking out the order related noise and high frequency components of the time averaged signal to enhance the amplitude envelope; and display means for displaying the enhanced signal to pinpoint the location of the excessively vibrating blade and indicate its relative vibration amplitude.

9. An apparatus for detecting and identifying an excessively vibrating blade of the rotating portion of a turbomachine by analysis of the characteristic Doppler waveform resulting from the vibrating blade comprising:

sensor means disposed at a fixed location proximate the rotating portion of the turbomachine for sensing the acoustical energy and generating a composite electrical signal in response thereto;

time averaging means for synchronous time averaging the detected composite signal to remove random noise and undesirable non-order related components therefrom;

blanking means for blanking out the order related noise components of the time averaged signal;

envelope detecting means for detecting the blanked time averaged signal and for blanking out the high frequency portion thereof to enhance the amplitude envelope; and display means for displaying the enhanced signal to pinpoint the location of the excessively vibrating blade and indicate its relative vibration amplitude.

* * * * *